(No Model.)

I. E. GAY.
COTTON CHOPPER.

No. 476,628. Patented June 7, 1892.

Witnesses
Jas. K. McCathran
W. S. Duvall

Inventor
I. E. Gay
By his Attorneys,
C. A. Snow & Co.

THE NORRIS PETERS CO., PHOTO-LITHO., WASHINGTON, D. C.

UNITED STATES PATENT OFFICE.

ISAAC E. GAY, OF CAMDEN, SOUTH CAROLINA.

COTTON-CHOPPER.

SPECIFICATION forming part of Letters Patent No. 476,628, dated June 7, 1892.

Application filed December 26, 1891. Serial No. 416,238. (No model.)

*To all whom it may concern:*

Be it known that I, ISAAC E. GAY, a citizen of the United States, residing at Camden, in the county of Kershaw and State of South Carolina, have invented a new and useful Cotton-Chopper, of which the following is a specification.

This invention relates to a cotton cultivator or chopper, the objects in view being to provide a machine of cheap and simple construction adapted to be used in the first working of the cotton and so constructed as to divide each row or furrow into stands and successfully eradicate from the stands, as well as between the same, all the young growth of grass, thus obviating the necessity of subsequent hoeing or chopping out by hand and placing the crop in such condition that a successful cultivation of the same may be accomplished by the use of the ordinary cotton-cultivator.

With these general objects in view the invention consists in certain features of construction hereinafter specified, and particularly pointed out in the claims.

Figure 1:
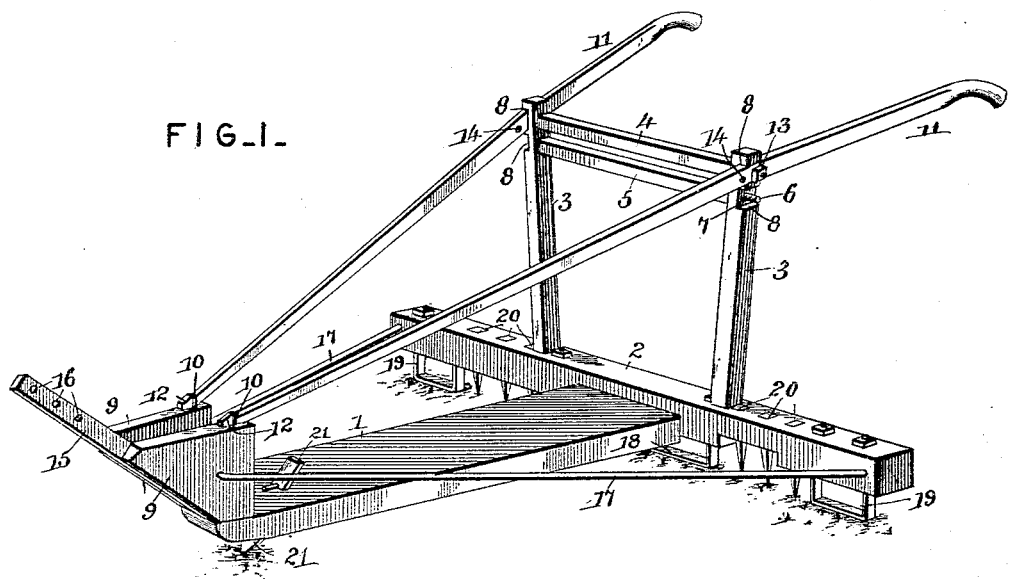
Figure 2:
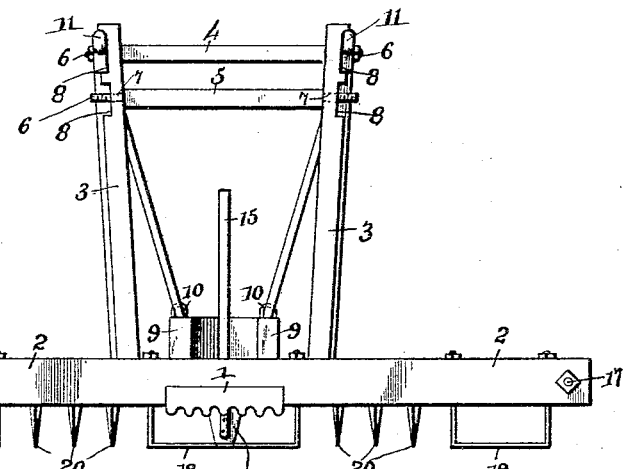

Referring to the drawings, Figure 1 is a perspective of a machine constructed in accordance with my invention. Fig. 2 is a rear elevation.

Like numerals of reference indicate like parts in all the figures of the drawings.

1 designates the main or longitudinal beam, to the rear end of which there is securely bolted the rear transverse beam 2, into the under edge of which and at its center is let the longitudinal or main beam 1. From the rear transverse beam 2 rises a pair of vertical standards 3, the upper ends of which are connected by cross-bars or rungs 4 and 5, the former being the uppermost. These rungs have their ends reduced or tenoned, as indicated at 6, and project through perforations 7, formed in the standards 3. The outer sides or faces of the standards 3 are provided with recesses 8, which occur coincident with the perforations 7. A V-shaped head-block 9 is bolted to the front end of the longitudinal or main beam 1, and upon the upper side of the same are secured by staples 10 the front shouldered ends of a pair of handles 11. The ends of the handles being shouldered, as shown at 12, permit a vertical movement of the rear ends of the handles, whereby they may be adjusted into either of the pairs of recesses 8 of the standards, and when in such recessses may be locked against accidental removal by passing perforations 14, with which the handles are each provided, over the ends or tenons of that rung 4 or 5 that projects into the recesses occupied by the handles. In this manner it will be obvious that the handles may be adjusted to various heights to suit the operator. The extremities of the cross-bars or rungs 4 and 5 may be threaded and nuts applied thereto, as shown at 13. A clevis-bar 15 projects from between the head-blocks 9 and is provided with a series of perforations 16, in any one of which may be connected the singletree-connecting device. Diagonal braces 17 have their forward ends let into the head-blocks 9 and their rear ends secured to the outer extremities of the rear transverse beam 2.

18 and 19 designate U-shaped choppers, the former being longer, preferably, than the latter. The long chopper 18 has its ends passed upwardly through the rear beam 2 and is nutted, as shown, to the center thereof, while the smaller choppers 19 (there being a pair) are similarly connected with the beam at each side of and some distance from the central chopper 18. The spaces between the series of choppers are filled with a series of rake-teeth 20, which depend into the same plane with the choppers. In order to adapt the beam for running over the soil, it may have its under side corrugated, and at the front end of said beam there is located a small steadying-plow 21, which is adjustable.

In operation, after the seed has been sowed and the furrows formed, thus dividing the plant into rows, and the young plants, together with the grass, completely fill each row, my machine is dragged across the rows transverse or at right angles to the before-mentioned furrows. The advance plow 21 breaks the ground and is followed by the choppers, the main chopper 18 being directly in rear of the plow. These choppers serve to chop off the spaces between the stands, or, in other words, form the stands, and the rake-teeth pass through the stands, thus destroying the growth of grass that is usually chopped out by hand. When the end of the field has been reached, the machine is turned and started toward the other side, the small end chopper 9 at the outer side of the chopper traveling back at one side of the same path it originally traveled. In this manner the crop is most thoroughly worked. The number of rake-teeth and length of choppers may be varied at will. The cotton being drilled is of course planted too deep to be affected much by the rake-teeth, while the light grass is readily torn up.

From the foregoing description, in connection with the accompanying drawings, it will be seen that I provide a machine which will greatly facilitate the heretofore arduous task of bringing the cotton to stands and of chopping out or removing from the young cotton the growth of grass that springs up with the same and which if not removed will destroy the crop.

Having described my invention, what I claim is—

1. In a machine of the class described, the combination, with the longitudinal beam, of the transverse rear beam, the U-shaped choppers spaced apart and depending from the under side of the same, and the series of rake-teeth depending from the transverse beam and alternating with the choppers, substantially as specified.

2. In a machine of the class described, the combination, with the longitudinal beam and the plow at the front end of the same, of the transverse beam bolted to the rear end of the longitudinal beam, the central and outer end U-shaped choppers secured to the under side of and depending from the transverse beam, and the series of rake-teeth also depending from said beam and alternating with the choppers, substantially as specified.

In testimony that I claim the foregoing as my own I have hereto affixed my signature in the presence of two witnesses.

ISAAC E. GAY.

Witnesses:
W. CLYBURN,
W. CLYBURN, Jr.